(12) United States Patent
Kubota

(10) Patent No.: US 11,928,987 B2
(45) Date of Patent: Mar. 12, 2024

(54) COMMODITY SALES DATA PROCESSING APPARATUS AND METHOD

(71) Applicant: Toshiba Tec Kabushiki Kaisha, Tokyo (JP)

(72) Inventor: Takahide Kubota, Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 97 days.

(21) Appl. No.: 17/665,068

(22) Filed: Feb. 4, 2022

(65) Prior Publication Data

US 2022/0392379 A1 Dec. 8, 2022

(30) Foreign Application Priority Data

Jun. 8, 2021 (JP) .................................. 2021-095996

(51) Int. Cl.
```
G09F 3/20        (2006.01)
G06Q 30/0207     (2023.01)
G06T 3/40        (2006.01)
G06T 7/00        (2017.01)
G06V 10/20       (2022.01)
```
(Continued)

(52) U.S. Cl.
CPC ......... *G09F 3/202* (2013.01); *G06Q 30/0207* (2013.01); *G06T 3/40* (2013.01); *G06T 7/0004* (2013.01); *G06V 10/25* (2022.01); *G06V 10/255* (2022.01); *G06V 10/422* (2022.01); *G06T 2207/30204* (2013.01)

(58) Field of Classification Search
CPC ....... G09F 3/202; G06Q 30/0207; G06T 3/40; G06T 7/0004; G06T 2207/30204; G06V 10/25; G06V 10/255; G06V 10/422; G06V 30/1473; G06V 2201/09; G06V 30/1448; G06V 30/166
See application file for complete search history.

(56) References Cited

U.S. PATENT DOCUMENTS 9,911,138 B2 * 3/2018 Grabovski ........... G06Q 20/387
2003/0133610 A1 * 7/2003 Nagarajan ................. G06T 7/12
382/173

(Continued)

FOREIGN PATENT DOCUMENTS

JP 2014-235530 A 12/2014
JP 6487498 B2 * 3/2019

*Primary Examiner* — Nizar N Sivji
(74) *Attorney, Agent, or Firm* — FOLEY & LARDNER LLP

(57) ABSTRACT

A commodity sales data processing apparatus includes an image processor and a controller. The image processor captures an image including a symbol. The symbol includes discount information relating to a discount on a price of a commodity. The controller acquires commodity information that uniquely specifies the commodity. The controller extracts a region from the image captured by the camera. The region includes the symbol. The controller transmits, to a server, an image of the region extracted by the controller. The controller acquires, from the server, the discount information based on the image transmitted to the server. The controller registers the commodity information acquired by the controller and a discounted price of the commodity based on the discount information acquired by the controller in association with each other.

11 Claims, 7 Drawing Sheets

(51) Int. Cl.
*G06V 10/25* (2022.01)
*G06V 10/422* (2022.01)

(56) References Cited

U.S. PATENT DOCUMENTS

| | | | | |
|---|---|---|---|---|
| 2009/0250516 | A1* | 10/2009 | Tsuchiya | G07G 1/0045 235/383 |
| 2011/0243446 | A1* | 10/2011 | Iizaka | G06Q 30/0207 382/182 |
| 2011/0251879 | A1* | 10/2011 | Lambert | G06Q 30/0224 705/14.1 |
| 2012/0104098 | A1* | 5/2012 | Matsuda | G07G 1/0045 235/462.01 |
| 2014/0156376 | A1* | 6/2014 | Sellers | G06Q 20/3276 235/383 |
| 2014/0246487 | A1* | 9/2014 | Mihara | G06K 7/1413 235/375 |
| 2015/0242892 | A1* | 8/2015 | Priebatsch | G06Q 30/0255 705/14.53 |
| 2017/0140362 | A1* | 5/2017 | Yamaguchi | G06Q 30/0238 |
| 2018/0005214 | A1* | 1/2018 | Sasaki | G06K 7/1417 |
| 2018/0181940 | A1* | 6/2018 | Fujiwara | G07G 1/0063 |
| 2018/0308156 | A1* | 10/2018 | Suzuki | G06Q 30/0635 |
| 2019/0318144 | A1* | 10/2019 | Iizaka | G06K 7/1404 |
| 2021/0342876 | A1* | 11/2021 | Haneda | G06T 7/0004 |

* cited by examiner

COMMODITY SALES DATA PROCESSING APPARATUS AND METHOD

CROSS-REFERENCE TO RELATED APPLICATION

This application is based upon and claims the benefit of priority from Japanese Patent Application No. 2021-095996, filed on Jun. 8, 2021, the entire contents of which are incorporated herein by reference.

FIELD

Embodiments described herein relate generally to a commodity sales data processing apparatus and method.

BACKGROUND

In a store such as a supermarket and a shopping center, a self-shopping system allows a portable terminal such as a smartphone or a tablet terminal owned by a consumer to be provided with a product registration function and a settlement function of a point of sales (POS) terminal by installing a dedicated application on the portable terminal.

In the self-shopping system, the customer captures an image of a surface of a paper such as a voucher ticket or a discount ticket by using a portable terminal owned by the customer. The captured image is transmitted to a management server, and the management server recognizes a discount amount or a discount rate shown in the image. Thus, the discount amount of the commodity is calculated.

DETAILED DESCRIPTION

In a self-shopping system as described above, there is a problem in that a communication load is high since all captured images are transmitted to the management server. Such a problem is addressed by the present disclosure.

In general, according to one embodiment, a commodity sales data processing apparatus and method capable of reading a label including discount information attached to a commodity with a lower communication load are provided.

A commodity sales data processing apparatus according to an embodiment includes a camera (e.g., an image processor) and a controller. The camera captures an image including a symbol. The symbol includes discount information relating to a discount on a price of a commodity. The controller acquires commodity information that uniquely specifies the commodity. The controller extracts a region from the image captured by the camera. The region includes the symbol. The controller transmits, to a server, an image of the region extracted by the controller. The controller acquires, from the server, the discount information based on the image transmitted to the server. The controller registers the commodity information acquired by the controller and a discounted price of the commodity based on the discount information acquired by the controller in association with each other.

At least one embodiment is described below with reference to the accompanying drawings. In the embodiment(s) shown below, an example, in which a commodity sales data processing apparatus according to an embodiment is applied to a self-checkout system 1 provided with a registration function and a settlement function of a commodity to be purchased by a customer, is described.

<Overall Configuration of Self-Checkout System>

Figure 1:
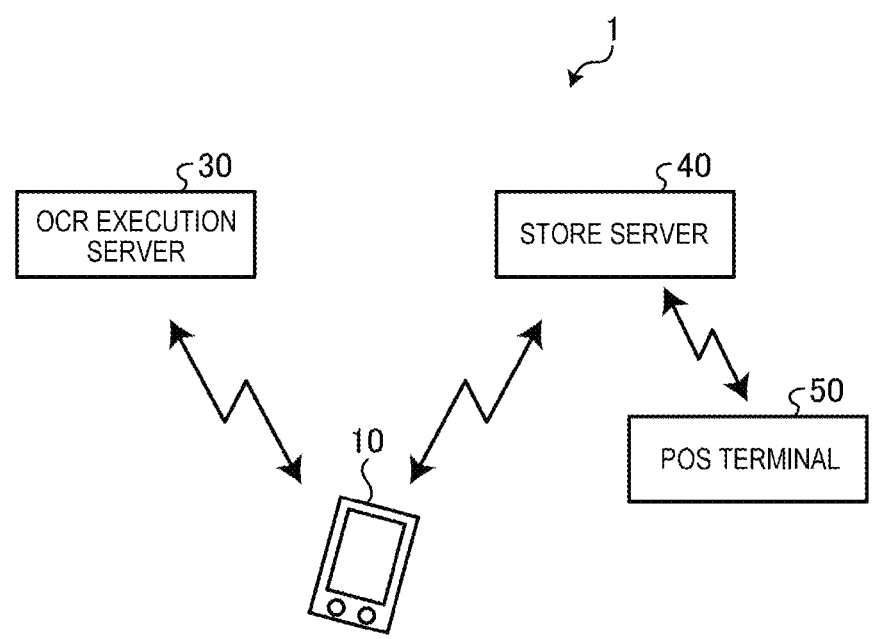
FIG. 1 is a system configuration diagram showing an example of a system configuration of a self-checkout system according to an embodiment.

FIG. 1 is a system configuration diagram showing an example of a system configuration of the self-checkout system according to the embodiment. As shown in FIG. 1, the self-checkout system 1 includes a portable terminal 10, an optical character recognition (OCR) execution server 30, a store server 40, and a POS terminal 50.

The portable terminal 10 and the OCR execution server 30, and the portable terminal 10 and the store server 40 are connected to each other via a public line (not shown) or the like so as to be able to communicate with each other. In addition, the store server 40 and the POS terminal 50 are connected to each other via a network (not shown) such as a local area network (LAN) so as to be able to communicate with each other.

The portable terminal 10 (e.g., a user device) is a portable-type terminal such as a smartphone or a tablet terminal associated with (e.g., owned, rented, or borrowed by) a customer who is shopping. When the customer shops, the portable terminal 10 performs a commodity registration of registering a commodity to be purchased and performs a settlement of settling the registered commodity. The portable terminal 10 is an example of the commodity sales data processing apparatus in the present disclosure.

When performing the commodity registration, the portable terminal 10 reads a code symbol such as a barcode or a two-dimensional code attached to or printed on the commodity and decodes code information registered in the code symbol. Then, the portable terminal 10 transmits the decoded code information to the store server 40. The store server 40 acquires commodity information such as a commodity name and a price corresponding to the code information by collating the code information received from the portable terminal 10 with a commodity master.

Then, the portable terminal 10 receives the commodity information transmitted by the store server 40.

In addition, the portable terminal 10 captures an image of a discount label L (see FIG. 4) attached to the commodity, and extracts a region including the discount label L from the captured image. Then, the portable terminal 10 transmits an image of the extracted region to the OCR execution server 30. Further, the portable terminal 10 receives, from the OCR execution server 30, discount information acquired by recognizing character information of the discount label L by the OCR execution server 30.

The portable terminal 10 calculates the price of the commodity based on the commodity information received from the store server 40 and the discount information received from the OCR execution server 30, and registers the commodity.

The self-checkout system 1 may be configured such that the OCR execution server 30 and the store server 40 communicate with each other via a network (not shown), and thereby, the OCR execution server 30 transmits the discount information recognized by an OCR to the store server 40, and the store server 40 calculates a discounted price of the commodity and sends the discounted price to the portable terminal 10.

The OCR execution server 30 receives the image of the region including the discount label L transmitted by the portable terminal 10. In addition, the OCR execution server 30 performs an OCR to recognize the character information of the discount label L shown in the received image. Further, the OCR execution server 30 transmits to the portable terminal 10 the discount information recognized by the OCR. The OCR execution server 30 is an example of the server device in the present disclosure.

The OCR is performed by a known algorithm. The OCR is performed by using, for example, a k-nearest neighbor method that classifies given data into the nearest pattern in teacher data prepared in advance, a support vector machine (SVM) method, which is a kind of supervised machine learning algorithm, or deep learning that automatically extracts and classifies features of the given data by using a neural network.

The store server 40 receives the code information of the commodity transmitted by the portable terminal 10. In addition, the store server 40 acquires the commodity information corresponding to the code information by collating the received code information with the commodity master. Further, the store server 40 transmits the acquired commodity information to the portable terminal 10.

When a customer who owns the portable terminal 10 selects cash settlement, the POS terminal 50 receives cash paid by the customer. In addition, the POS terminal 50 dispenses one or more coins if necessary. Further, the POS terminal 50 prints a result of the cash settlement on a receipt and dispenses the receipt.

When the customer who owns the portable terminal 10 selects cashless settlement such as electronic money settlement or credit card settlement, the portable terminal 10 transmits the settlement result to an electronic receipt server (not shown). Then, the portable terminal 10 receives an electronic receipt, which is dispensed by the electronic receipt server and indicates the settlement result. The customer browses the received electronic receipt on a screen of the portable terminal 10 and confirms the settlement result.

<Hardware Configuration of Portable Terminal>

Figure 2:
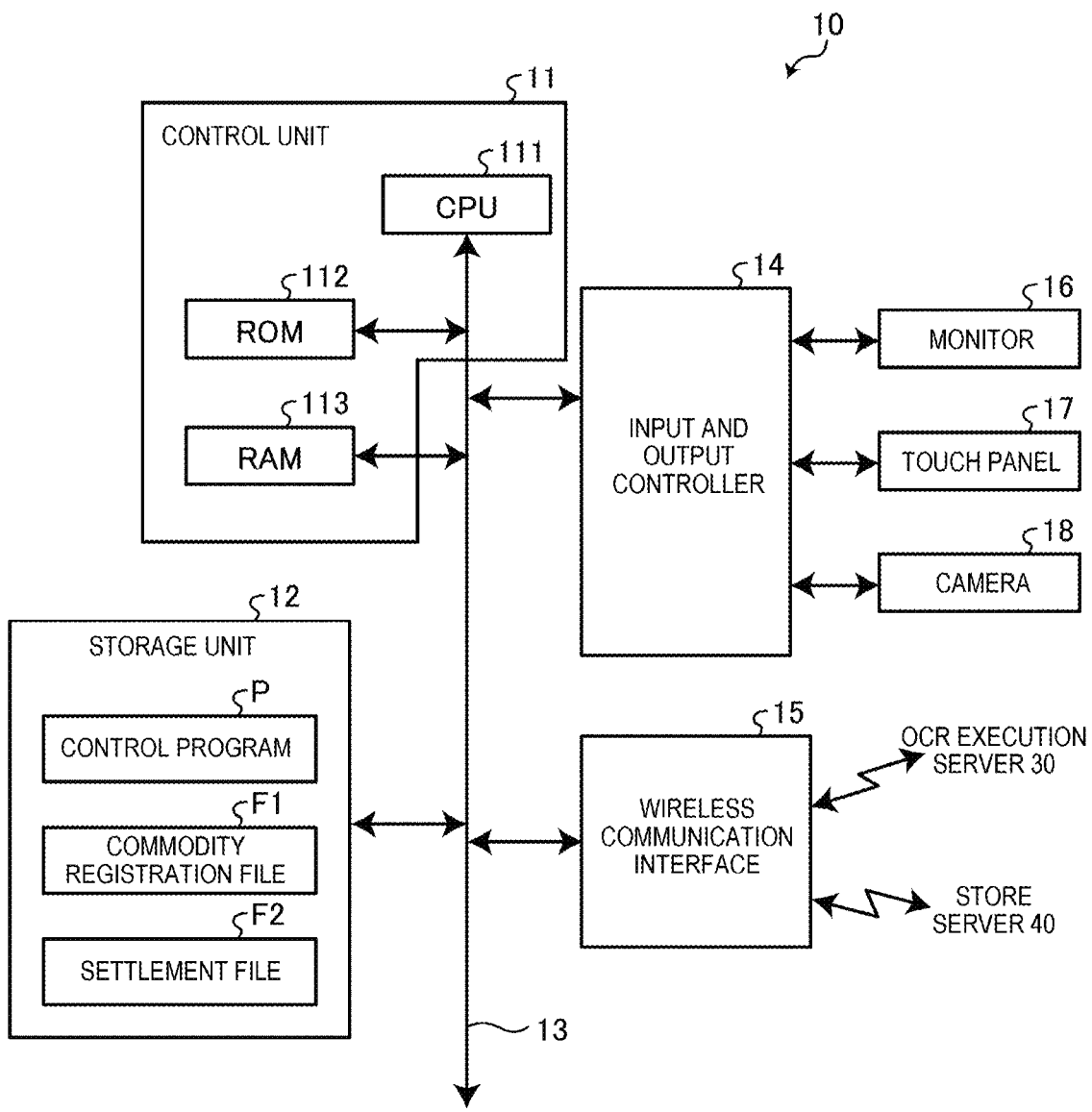
FIG. 2 is a hardware block diagram showing an example of a hardware configuration of a portable terminal according to the embodiment.

A hardware configuration of the portable terminal 10 will be described with reference to FIG. 2. FIG. 2 is a hardware block diagram showing an example of the hardware configuration of the portable terminal according to the embodiment.

As shown in FIG. 2, the portable terminal 10 includes a control unit 11, a storage unit 12, an input and output controller 14, and a wireless communication interface 15.

The control unit 11 (e.g., a controller) includes a central processing unit (CPU) 111 (e.g., a processor, a processing circuit), a read only memory (ROM) 112 (e.g., a memory, a memory device), and a random access memory (RAM) 113. The CPU 111 is a control entity of the portable terminal 10. The ROM 112 stores various fixed data, various tables, and the like. The RAM 113 functions as a work memory by loading a control program and various data when the CPU 111 performs various processes.

The storage unit 12 (e.g., a memory, a memory device) stores a control program P, a commodity registration file F1, and a settlement file F2.

The control program P is a program to be executed by the CPU 111. The CPU 111, the ROM 112, the RAM 113, and the storage unit 12 are connected to each other via an internal bus 13, and the CPU 111 of the control unit 11 operates the RAM 113 to load the control program P stored in the storage unit 12 and various data stored in the ROM 112. Thus, the control unit 11 performs various control processes relating to the portable terminal 10.

The control program P may be provided in a state of being stored in the storage unit 12, and may be provided by being recorded on a computer-readable recording medium such as a CD-ROM, a flexible disk (FD), a CD-R, or a digital versatile disk (DVD) as a file in an installable or executable format. In addition, the control program P may be provided by being stored on a computer connected to a network and being downloaded via the network. Further, the control program P may be provided or distributed via a network such as the Internet.

The commodity registration file F1 is a file that stores the commodity information registered by the customer.

The settlement file F2 is a file that stores a result of the cashless settlement by the portable terminal 10. The settlement file F2 may store an electronic receipt received from an electronic receipt management server.

The input and output controller 14 connects, via the internal bus 13, the CPU 111 to a monitor 16, a touch panel 17, and a camera 18, which are peripheral devices. The input and output controller 14 controls an operation of each of these peripheral devices in response to an instruction from the control unit 11.

The monitor 16 (e.g., a user interface, an operator interface, an output device, a display, etc.) is a display device included in the portable terminal 10, and is implemented by a liquid crystal panel, an organic EL panel, and the like. The control unit 11 of the portable terminal 10 displays on the monitor 16 a screen relating to results of various processes performed by the portable terminal 10, a user interface screen relating to operations of various processes, and the like. In addition, while the camera 18 is capturing an image, the control unit 11 of the portable terminal 10 displays the captured image on the monitor 16. A user adjusts a position of the camera 18 while viewing the monitor 16 such that an appropriate image can be captured.

The touch panel 17 (e.g., a user interface, an operator interface, an input device, etc.) is an operation device included in the portable terminal 10. The control unit 11 of the portable terminal 10 performs a process according to an operation content detected by the touch panel 17. The portable terminal 10 may include a physical switch in addition to the touch panel 17.

The camera 18 is built in the portable terminal 10 and captures an image of the code symbol such as the barcode attached to or printed on the commodity. In addition, the camera 18 captures an image of the discount label L attached to the commodity.

The wireless communication interface 15 connects the control unit 11, the OCR execution server 30, and the store server 40 via the internal bus 13. In addition, the wireless communication interface 15 connects the control unit 11 and the electronic receipt management server (not shown).

The OCR execution server 30, the store server 40, the POS terminal 50, and the electronic receipt management server (not shown) among hardware constituting the self-checkout system 1 are not described in terms of hardware configuration. Similar to the portable terminal 10, each device has a generic computer configuration to be operated by a control program.

<Function Configuration of Portable Terminal>

Figure 3:
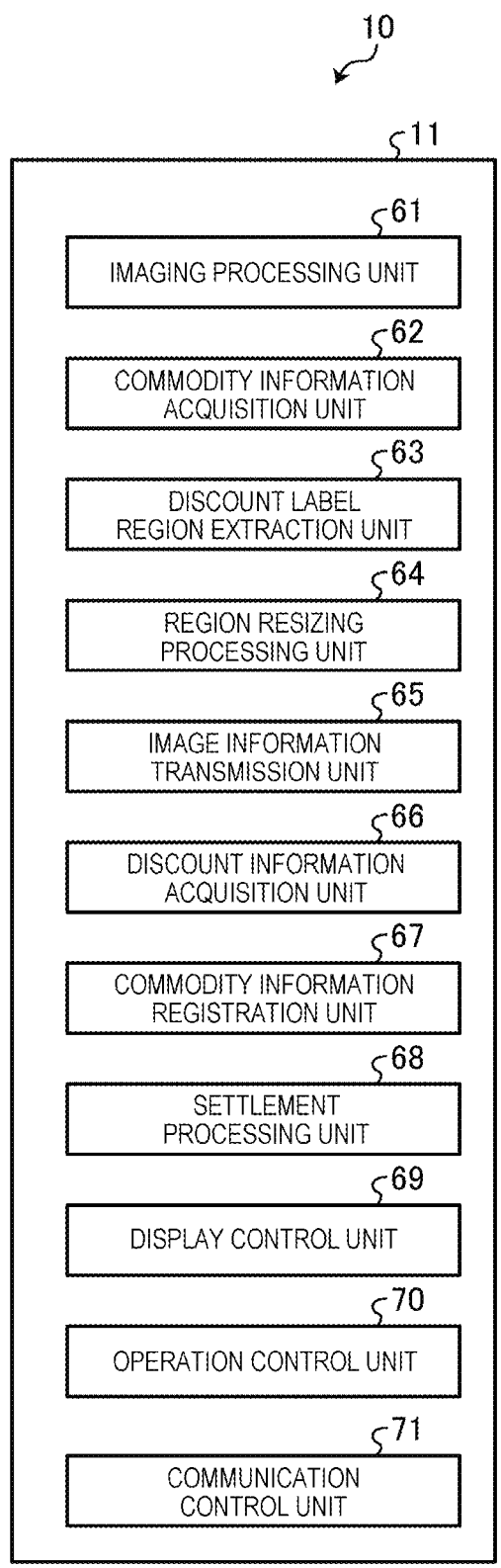
FIG. 3 is a functional block diagram showing an example of a function configuration.

A function configuration of the portable terminal 10 will be described with reference to FIG. 3. FIG. 3 is a functional block diagram showing an example of the function configuration of the portable terminal according to the embodiment.

The control unit 11 of the portable terminal 10 implements an imaging processing unit 61, a commodity information acquisition unit 62, a discount label region extraction unit 63, a region resizing processing unit 64, an image information transmission unit 65, a discount information acquisition unit 66, a commodity information registration unit 67, a settlement processing unit 68, a display control unit 69, an operation control unit 70, and a communication control unit 71 shown in FIG. 3 as function units by operating the RAM 113 to load the control program P.

The imaging processing unit 61 captures, by the camera 18, an image including the discount label L including the discount information of the commodity. In addition, the imaging processing unit 61 captures an image including a code symbol such as a barcode 84 (see FIG. 4) attached to or printed on the commodity.

The commodity information acquisition unit 62 extracts a region of the code symbol from the captured image of the code symbol and decodes code information registered in the code symbol. In addition, the commodity information acquisition unit 62 transmits to the store server 40 the code information acquired by decoding. Further, the commodity information acquisition unit 62 acquires, from the store server 40, commodity information that uniquely specifies the commodity.

The commodity information acquisition unit 62 extracts the region of the code symbol from the image captured by the imaging processing unit 61 by extracting a feature (for example, a black-and-white repeated pattern) of the code symbol such as a barcode.

The discount label region extraction unit 63 determines whether a flag label F (see FIG. 4) is captured in the image captured by the imaging processing unit 61. Specifically, the discount label region extraction unit 63 determines whether the flag label F is captured, by extracting, from the image captured by the imaging processing unit 61, a region having features same as features such as a shape and a color of the flag label F.

In addition, the discount label region extraction unit 63 extracts a region including at least the discount label L from the image captured by the imaging processing unit 61. Specifically, the discount label region extraction unit 63 extracts the region including the discount label L, by extracting, from the image captured by the imaging processing unit 61, a region having features, such as a shape and a color, that are known to correspond to the discount label L. A method of extracting the region including the discount label L will be described in detail later (see FIG. 6). The discount label region extraction unit 63 is an example of the region extraction unit in the present disclosure.

Further, the discount label region extraction unit 63 writes a predetermined value in a region other than the discount label L in the extracted region.

The region resizing processing unit 64 resizes, to a predetermined size, an image of the region extracted by the discount label region extraction unit 63. This is because when the customer captures an image of the commodity by using the camera 18 of the portable terminal 10, a size of the captured discount label L in the image is non-uniform due to a variation in distance between the camera 18 and the commodity, and therefore, the size of the discount label L is made uniform. That is, when an image including a discount label L having a non-uniform size is transmitted to the OCR execution server 30 as it is, for example, in an image obtained by capturing a small image of the discount label L, the accuracy of character recognition by the OCR execution server 30 may deteriorate. The region resizing processing unit 64 makes the size of the discount label L uniform by, for example, performing image enlargement or image reduction. The region resizing processing unit 64 is an example of the size adjustment unit in the present disclosure.

The image information transmission unit 65 transmits to the OCR execution server 30 the image of the region including the discount label L extracted by the discount label region extraction unit 63. The image information transmission unit 65 is an example of the transmission unit in the present disclosure.

The discount information acquisition unit 66 acquires, from the OCR execution server 30, the discount information of the commodity recognized by the OCR execution server 30 based on the image of the region including the discount label L transmitted by the image information transmission unit 65.

The commodity information registration unit 67 registers the commodity information acquired by the commodity information acquisition unit 62 and the price of the commodity based on the discount information acquired by the discount information acquisition unit 66 in association with each other.

The settlement processing unit 68 performs a settlement by a settlement method specified by the user based on a registration result obtained by the commodity information registration unit 67. When the user selects cash settlement, the POS terminal 50 performs the settlement.

The display control unit 69 controls a display content of the monitor 16 according to an instruction from the control unit 11.

The operation control unit 70 detects an operation state of the touch panel 17 and transmits the operation state to the control unit 11.

The communication control unit 71 controls communication between the portable terminal 10 and an external device (e.g., the OCR execution server 30, the store server 40, and the electronic receipt management server (not shown)).

<Configurations of Code Symbol and Discount Label>

Figure 4:
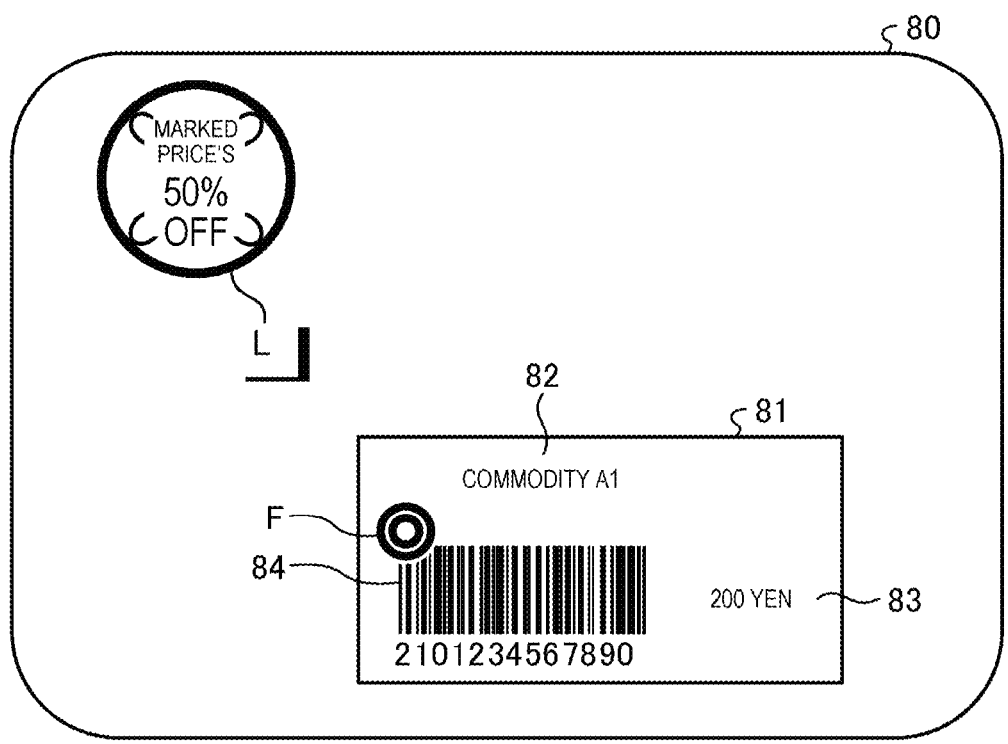
FIG. 4 is a diagram showing an example of a barcode and a discount label attached to a commodity.
Figure 5:
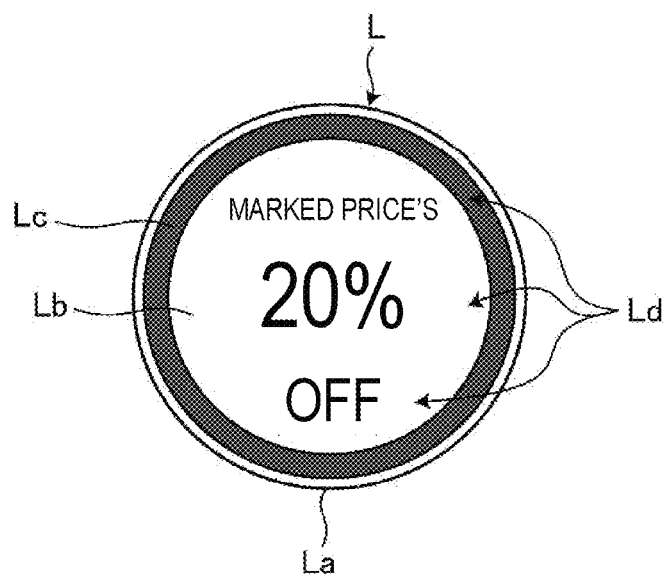
FIG. 5 is a diagram showing an example of the discount label.

Configurations of the barcode 84 and the discount label L will be described with reference to FIG. 4 and FIG. 5. FIG. 4 is a diagram showing an example of the barcode and the discount label attached to the commodity. FIG. 5 is a diagram showing an example of the discount label.

A barcode label 81 and the discount label L are attached to a surface of a commodity 80. A commodity name 82, a commodity price 83, and the barcode 84, and the like of the commodity 80 are formed (e.g., printed) on the barcode label 81. Information such as a commodity code that uniquely specifies the commodity 80 is registered in the barcode 84. In addition, the commodity code registered in the barcode 84 is printed on a lower portion of the barcode 84. A two-dimensional code (e.g., a QR code) may be attached to the surface of the commodity 80 instead of the barcode 84.

The discount label L is a label on which character information indicating a discount amount or a discount rate relating to the commodity 80 is displayed. The discount label L has a predetermined shape, size, color, and design.

The discount label L is an example of a symbol in the present disclosure. The configuration of the discount label L will be described in detail later (see FIG. 5).

The flag label F (e.g., an indicator) indicating that the discount label L is attached to the commodity 80 is attached in the vicinity of the barcode 84 (e.g., the flag label F at least partially covers the barcode label 81). The flag label F has a predetermined shape, size, color, and design.

The portable terminal 10 causes the camera 18 to capture an image of a region including the barcode 84. Then, the portable terminal 10 recognizes that the discount label L is attached to the commodity 80, provided that the flag label F is captured in the image of the region including the barcode 84. The portable terminal 10 causes the camera 18 to capture an image of the region including the discount label L after capturing the image of the region including the barcode 84.

As shown in FIG. 5, the discount label L has a contour La, a base Lb, a decoration Lc, and character information Ld.

The contour La specifies an outer shape of the discount label L. The contour La has a predetermined shape such as a circular shape, a rectangular shape, or a triangular shape. In addition, the size of the discount label L formed by the contour La shall be the same, at least in the same store.

The base Lb specifies the color of the discount label L. In order to improve a visibility of the character information Ld marked on the discount label L, it is desirable that the base Lb and the character information Ld have a color scheme having the highest possible contrast.

The decoration Lc is a pattern given along an outer circumference of the discount label L. It is desirable that the decoration Lc is as prominent in color and design as possible such that the customer can notice the presence of the discount label L when glancing at the commodity 80.

The character information Ld is discount information of the commodity 80 (e.g., an indication of a magnitude or amount of the discount). The character information Ld represents a discount rate or a discount amount with respect to the commodity price 83 marked on the barcode label 81. When representing the discount rate, the character information Ld is given in the form of text or a text-based message, for example, "marked price's 20% off" as shown in FIG. 5 (e.g., indicating that the discount takes 20% off of the marked price). In addition, when representing the discount amount, the character information Ld may be represented as an amount of money instead of a percentage of the marked price, such as "30 yen off from marked price". Further, the character information Ld may be information relating to a point return rate (e.g., a rate at which reward points are earned in a cash back or other reward system for purchasing the commodity 80). For example, in a case where a higher point return than usual can be received when purchasing the commodity 80, information such as "double points" may be given as the character information Ld.

The features such as a shape and a color of the discount label L (features relating to the contour La, the base Lb, and the decoration Lc) and a variation of the character information Ld are registered in the OCR execution server 30 in advance.

<Method of Extracting Region Including Discount Label>

Figure 6:
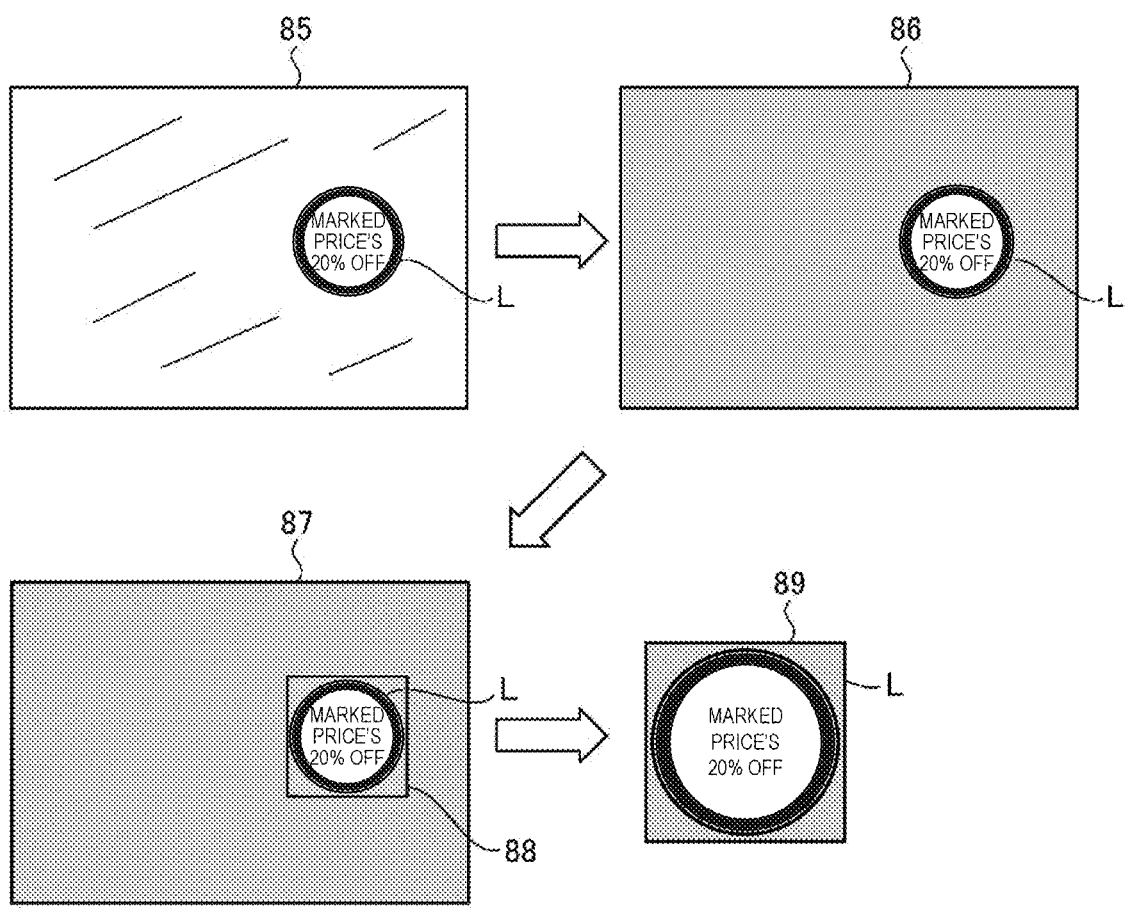
FIG. 6 is a diagram illustrating a method of extracting a region including the discount label by the portable terminal.

A method of extracting the region including the discount label L by the portable terminal 10 will be described with reference to FIG. 6. FIG. 6 is a diagram illustrating the method of extracting the region including the discount label by the portable terminal.

The discount label region extraction unit 63 determines whether the discount label L is captured in an image 85 captured by the imaging processing unit 61. Specifically, the discount label region extraction unit 63 determines whether the discount label L is captured in the image 85 depending on whether features same as the features such as a shape and a color of the discount label L are included.

As the features such as a shape and a color of the discount label L, information about the contour La, the base Lb, and the decoration Lc of the discount label L described in FIG. 5 is used.

The discount label region extraction unit 63 detects, for example, from the image 85, edge constituent points, each having a pixel value (e.g., a value indicating a color or darkness of a portion of the image 85) equal to or higher than a predetermined threshold value, between adjacent pixels. Then, when a shape of a figure formed of the edge constituent points is similar to the shape of the contour La or the shape of the decoration Lc of the discount label L, the discount label region extraction unit 63 determines that the discount label L is captured in the image 85. When the contour La of the discount label L is moved out of an edge of the image 85, since the shape of the contour La is incomplete, the discount label region extraction unit 63 does not determine that the discount label L is captured in the image 85. In other words, the discount label region extraction unit 63 only determines that the discount label L is captured in the image 85 if the image 85 contains a complete image of the discount label L.

In addition, when the customer captures an image of a commodity by using the camera 18 of the portable terminal 10, it is difficult to maintain a constant positional relationship between the camera 18 and the commodity. Therefore, the camera 18 may capture an image of the commodity at an angle. In such a case, for example, a circular discount label L is imaged as an elliptical region. In addition, a rectangular discount label L is imaged as a rectangular region or a trapezoidal region with different aspect ratios. It is desirable that the discount label region extraction unit 63 also store a shape model when the discount label L is captured at an angle such that the discount label region extraction unit 63 can determine whether the discount label L is captured in the image captured by the camera 18 even when a posture of the camera 18 is changed in this way (e.g., the camera 18 is not perpendicular to the surface of the discount label L).

In addition, the discount label region extraction unit 63 may determine that the discount label L is captured in the image 85 when a color inside the contour La is substantially the same as a color of the base Lb of the discount label L.

Further, the discount label region extraction unit 63 may determine that the discount label L is captured in the image 85 when the decoration Lc is captured inside the contour La.

The discount label region extraction unit 63 may determine whether the discount label L is captured in the image 85 by detecting, from the image 85, all of the shape of the contour La, the shape of the decoration Lc, the color of the base Lb, and a color of the decoration Lc of the discount label L, or may determine whether the discount label L is captured in the image 85 by using only a part of the above-mentioned features.

The discount label region extraction unit 63 writes a predetermined pixel value set in advance to pixels other than the region of the discount label L when determining that the discount label L is captured in the image 85. In other words, the image 85 includes a first section containing the discount label L and a second section outside of the discount label. The discount label region extraction unit 63 modifies the second section. Specifically, the discount label region extraction unit 63 modifies all of the pixels in the second section to have a predetermined pixel value (e.g., corresponding to a predetermined color and/or darkness). Accordingly, the modified second section has a uniform visual appearance (e.g., a uniform color and/or a uniform darkness). An example of such a change is shown in the first two steps of FIG. 6. By writing the predetermined pixel value, for example, an image 86 shown in FIG. 6 can be obtained. The predetermined pixel value is any value between 0 and 255 in the case of, for example, an image in which one pixel has a capacity of 8 bits.

Subsequently, the discount label region extraction unit 63 sets a region 88 including the discount label L in the image 86. It is sufficient that the region 88 includes at least the discount label L. In an image 87 shown in FIG. 6, the region 88 circumscribing the discount label L is set. As shown in FIG. 6, the region 88 includes a portion of the second section of the image 85 that was modified by the discount label region extraction unit 63. It is desirable that a shape of the region 88 is rectangular so as to improve an efficiency of a subsequent process.

Next, the region resizing processing unit 64 generates a partial image 89 by resizing, to a predetermined size, an image of the region 88 extracted by the discount label region extraction unit 63. By this process, when the captured discount label L is too large, the region 88 is reduced, and when the captured discount label L is too small, the region 88 is enlarged.

The partial image 89 generated in this way is transmitted to the OCR execution server 30, and the OCR execution server 30 recognizes the character information Ld.

<Process Flow Performed by Self-Checkout System>

Figure 7:
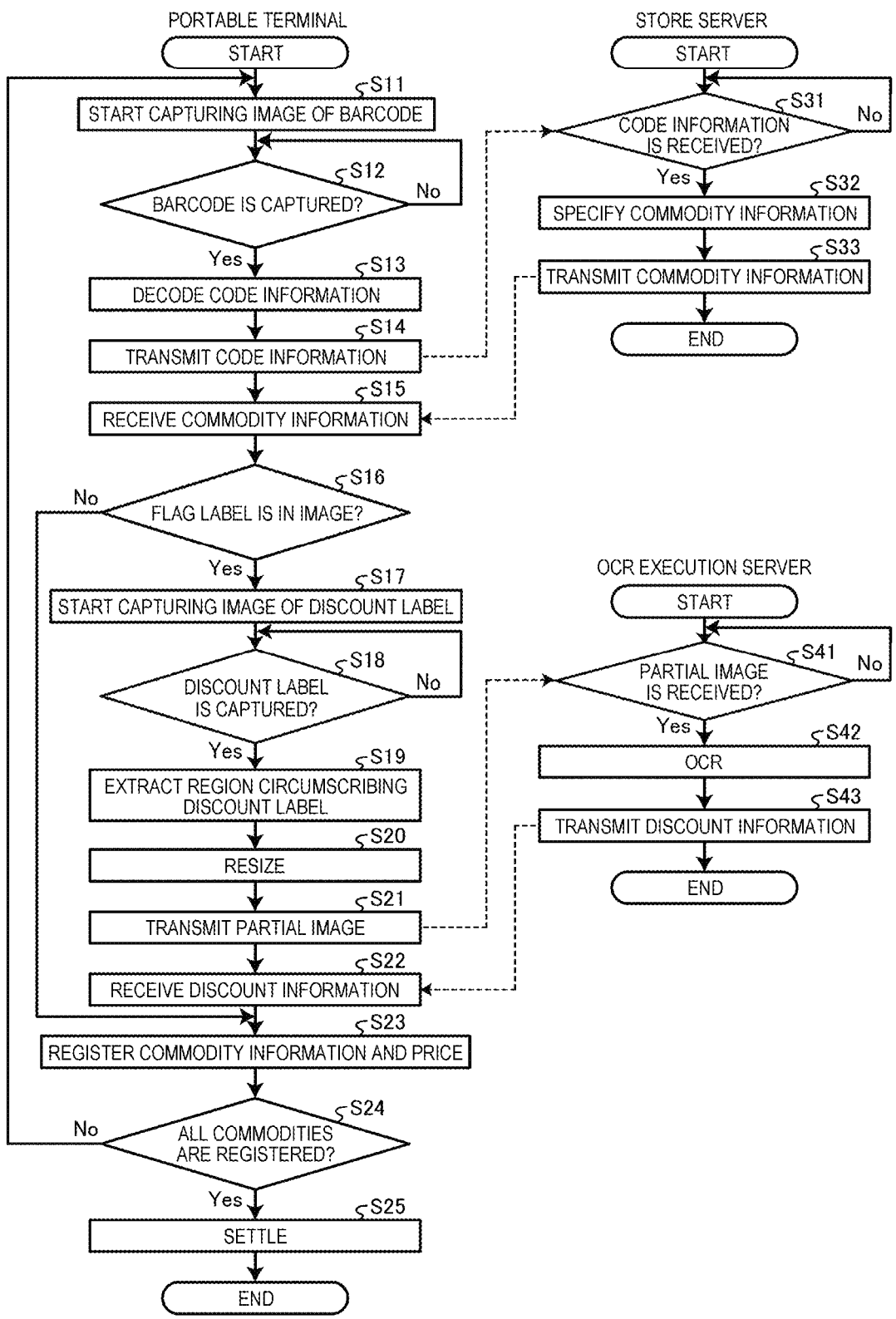
FIG. 7 is a flowchart illustrating an example of a process flow performed by the self-checkout system according to the embodiment.

A process flow performed by the self-checkout system 1 will be described with reference to FIG. 7. FIG. 7 is a flowchart illustrating an example of a process flow performed by the self-checkout system according to the embodiment.

(Process Flow Performed by Portable Terminal)

The imaging processing unit 61 starts capturing an image of the barcode 84 (Act S11).

The imaging processing unit 61 determines whether the barcode 84 is captured (Act S12). When the imaging processing unit 61 determines that the barcode 84 is captured (Yes in Act S12), the process proceeds to Act S13. On the other hand, when the imaging processing unit 61 determines that the barcode 84 is not captured (No in Act S12), Act S12 is repeated.

When the imaging processing unit 61 determines that the barcode 84 is captured in Act S12, the commodity information acquisition unit 62 decodes the captured code information (Act S13).

Subsequently, the commodity information acquisition unit 62 transmits the decoded code information to the store server 40 (Act S14).

Further, the commodity information acquisition unit 62 receives the commodity information from the store server 40 (Act S15).

The imaging processing unit 61 determines whether the flag label F is captured in the image obtained by capturing the image of the barcode 84 (Act S16). When the imaging processing unit 61 determines that the flag label F is captured (Yes in Act S16), the process proceeds to Act S17. On the other hand, when the imaging processing unit 61 determines that the flag label F is not captured (No in Act S16), that is, when there is no discount of the commodity, the process proceeds to Act S23.

When the imaging processing unit 61 determines that the flag label F is captured in Act S16, the imaging processing unit 61 starts capturing an image of the discount label L (Act S17).

The discount label region extraction unit 63 determines whether the discount label L is captured (Act S18). When the discount label region extraction unit 63 determines that the discount label L is captured (Yes in Act S18), the process proceeds to Act S19. On the other hand, when the discount label region extraction unit 63 determines that the discount label L is not captured (No in Act S18), Act S18 is repeated.

When the discount label region extraction unit 63 determines that the discount label L is captured in Act S18, the discount label region extraction unit 63 extracts the region 88 circumscribing the discount label L (Act S19).

Subsequently, the region resizing processing unit 64 performs a resizing of resizing, to a predetermined size, the image of the region 88 extracted by the discount label region extraction unit 63 in Act S19 (Act S20).

The image information transmission unit 65 transmits the partial image 89 to the OCR execution server 30 (Act S21).

The discount information acquisition unit 66 acquires the discount information of the commodity acquired by recognizing, by the OCR execution server 30, a content of the character information Ld of the discount label L included in the partial image 89 (Act S22).

The commodity information registration unit 67 registers the commodity information acquired in Act S15 and the discount information acquired in Act S22 in association with each other (Act S23).

The commodity information registration unit 67 determines whether all the commodities are registered (Act S24). When the commodity information registration unit 67 determines that all the commodities are registered (Yes in Act S24), the process proceeds to Act S25. On the other hand, when the commodity information registration unit 67 determines that not all the commodities are registered (No in Act S24), the process returns to Act S11. The commodity information registration unit 67 determines that all the commodities are registered, for example, when a "commodity registration completion button" (not shown) displayed on the monitor 16 of the portable terminal 10 is pressed.

When the commodity information registration unit 67 determines that all the commodities are registered in Act S24, the settlement processing unit 68 performs a settlement based on a registration result by the commodity information registration unit 67 (Act S25). Then, the portable terminal 10 ends the process in FIG. 7.

<Process Flow Performed by Store Server>

Next, a process flow performed by the store server 40 will be described.

The store server 40 determines whether the code information of the commodity is received from the portable terminal 10 (Act S31). When the store server 40 determines that the code information of the commodity is received (Yes in Act S31), the process proceeds to Act S32. On the other hand, when the store server 40 determines that the code information of the commodity is not received (No in Act S31), Act S31 is repeated.

When the store server 40 determines that the code information of the commodity is received in Act S31, the store server 40 specifies the commodity information (e.g., commodity name, price, etc.) corresponding to the commodity information by collating the received code information with the commodity master (Act S32).

Next, the store server 40 transmits the specified commodity information to the portable terminal 10 (Act S33). Then, the store server 40 ends the process in FIG. 7.

<Process Flow Performed by OCR Execution Server>

Next, a process flow performed by the OCR execution server 30 will be described.

The OCR execution server 30 determines whether the partial image 89 is received from the portable terminal 10 (Act S41). When the OCR execution server 30 determines that the partial image 89 is received (Yes in Act S41), the process proceeds to Act S42. On the other hand, when the OCR execution server 30 determines that the partial image 89 is not received (No in Act S41), Act S41 is repeated.

When the OCR execution server 30 determines that the partial image 89 is received in Act S41, the OCR execution server 30 performs an OCR of recognizing the character information Ld included in the received partial image 89 (Act S42).

Next, the OCR execution server 30 transmits, to the portable terminal 10, the discount information acquired by recognizing the character information Ld (Act S43). Then, the OCR execution server 30 ends the process in FIG. 7.

As described above, the portable terminal 10 (e.g., a commodity sales data processing apparatus) according to the embodiment includes: the commodity information acquisition unit 62 configured to acquire the commodity information that uniquely specifies the commodity; the imaging processing unit 61 configured to capture the image including the discount label L (e.g., a symbol) including the discount information of the commodity; the discount label region extraction unit 63 (e.g., a region extraction unit) configured to extract, from the image captured by the imaging processing unit 61, the region including at least the discount label L; the image information transmission unit 65 (e.g., a transmission unit) configured to transmit, to the OCR execution server 30 (e.g., a server device, a server, etc.), the image of the region extracted by the discount label region extraction unit 63; the discount information acquisition unit 66 configured to acquire, from the OCR execution server 30, the discount information of the commodity based on the image transmitted by the image information transmission unit 65; and the commodity information registration unit 67 configured to register the commodity information acquired by the commodity information acquisition unit 62 and the price of the commodity based on the discount information acquired by the discount information acquisition unit 66 in association with each other. Therefore, the portable terminal 10 performs a preprocess of extracting the discount label L, and transmits, to the OCR execution server 30, the image of the region including at least the discount label L. Therefore, compared with a case where the entire including the discount label L is transmitted to the OCR execution server 30 and the OCR execution server 30 recognizes discount information, the discount label L can be read with a low communication load. In addition, since the OCR is performed by the OCR execution server 30, the accuracy of the character recognition can be improved by updating an OCR engine on a server side. In addition, since an image can be retained on the server side, a log can be collected more easily when an erroneous recognition occurs.

In addition, in the portable terminal 10 (e.g., a commodity sales data processing apparatus) according to the embodiment, the discount label region extraction unit 63 (e.g., a region extraction unit) extracts the region including the discount label L (e.g., a symbol) and writes a predetermined value in a region other than the discount label L in the extracted region. Therefore, since the region of the discount label L is clarified, the recognition in the OCR execution server 30 can be performed more easily. In addition, when transmitting the partial image 89 to the OCR execution server 30, since the same pixel value is consecutive for pixels in which a predetermined value is written, an amount of communication can be reduced by, for example, performing run-length compression on the pixels and transmitting the compressed pixels.

In addition, the portable terminal 10 (e.g., a commodity sales data processing apparatus) according to the embodiment further includes the region resizing processing unit 64 (e.g., a size adjustment unit) configured to resize, to a predetermined size, the image of the region extracted by the discount label region extraction unit 63 (e.g., a region extraction unit). Therefore, when transmitting the image of the extracted region to the OCR execution server 30, a quality of the transmitted image can be made as uniform as possible, and thus, the OCR execution server 30 can recognize the character information Ld with stable accuracy.

In addition, the portable terminal 10 (e.g., a commodity sales data processing apparatus) according to the embodiment is the portable terminal 10 owned by the customer. Therefore, the customer can register and settle the commodity by the portable terminal 10 owned by the customer.

<Modification of Embodiment>

A modification of the embodiment will be described below with reference to the accompanying drawings. In the modification of the embodiment shown below, when the camera 18 of the portable terminal 10 described in the embodiment captures an image of the discount label L, a guide frame 92 (e.g., a visual indicator, a box, a frame, etc.) indicating an appropriate imaging size of the discount label L is displayed on a screen of the monitor 16 configured to monitor the captured image. The portable terminal 10 in the modification of the embodiment includes the same hardware configuration and function configuration as those in the embodiment. Therefore, in the following description, the same hardware components and function components as those in the embodiment are described by using the same reference numerals.

Figure 8:
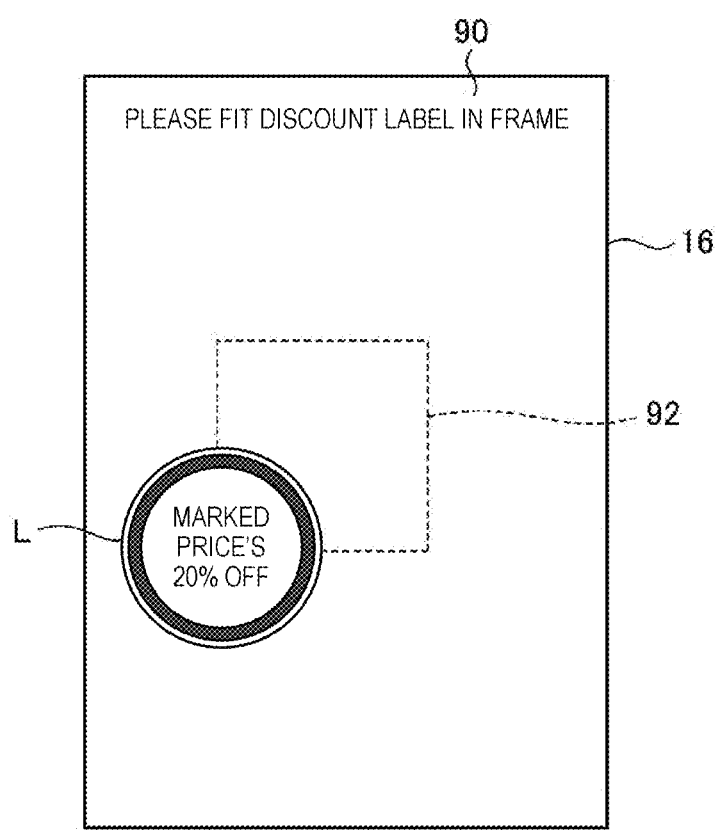
FIG. 8 is a diagram illustrating an imaging state of a discount label in a modification of the embodiment.

An operation example of the modification of the embodiment will be described with reference to FIG. 8. FIG. 8 is a diagram illustrating an imaging state of a discount label in the modification of the embodiment.

When the imaging processing unit 61 of the portable terminal 10 causes the camera 18 to capture an image including the discount label L, the display control unit 69 is caused to superimpose and display the guide frame 92 indicating the appropriate imaging size of the discount label L on a screen configured to monitor the captured image, that is, the monitor 16.

In addition, the imaging processing unit 61 causes the display control unit 69 to superimpose and display, on the captured image displayed on the monitor 16, a message 90 guiding an adjustment of the discount label L such that the discount label L fits in the guide frame 92. The message 90 is, for example, a phrase such as "please fit discount label in frame".

A user confirms the image displayed on the monitor 16 while causing the camera 18 of the portable terminal 10 to capture an image of the discount label L of the commodity 80. Then, a position of the camera 18 of the portable terminal 10 is changed such that the discount label L fits in the guide frame 92.

When the imaging processing unit 61 of the portable terminal 10 causes the camera 18 to capture an image of the barcode 84, the display control unit 69 is caused to superimpose and display, on the captured image on the monitor 16, a guide frame indicating an appropriate imaging size of the barcode 84.

As described above, when the imaging processing unit 61 captures an image including the discount label L (e.g., a symbol), the portable terminal 10 (e.g., a commodity sales data processing apparatus) in the modification of the embodiment displays the guide frame 92 indicating the appropriate imaging size of the discount label L on the screen configured to monitor the image. Therefore, when the customer captures an image of the commodity 80 by using the portable terminal 10, the discount label L may be captured to fit in the guide frame 92, and thus, the discount label L can be easily captured with an appropriate size.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A commodity sales data processing apparatus comprising:
    an image processor configured to capture an image including a symbol, the symbol including discount information relating to a discount on a price of a commodity; and
    a controller configured to:
        acquire commodity information that uniquely specifies the commodity from a code symbol captured by the image processor;
        determine whether the image processor detects a flag label on the commodity, the flag label indicating that the symbol is present on the commodity;
        extract a region from the image captured by the image processor in response to a determination that the image processor detects the flag label on the commodity, the region including a first section and a second section, and the first section including the symbol;
        modify a pixel of the second section to have a predetermined pixel value:
        resize, to a predetermined size, an image of the region extracted by the controller and including the modified pixel;
        transmit, to a server, the image of the region that has been resized;
        acquire, from the server, the discount information based on the image transmitted to the server; and
        register (a) the commodity information acquired by the controller and (b) a discounted price of the commodity based on the discount information acquired by the controller in association with each other.

2. The commodity sales data processing apparatus of claim 1, wherein the controller is configured to modify the second section to have a uniform visual appearance.

3. The commodity sales data processing apparatus of claim 1, further comprising a screen, wherein the controller is configured to control the screen to display (a) the image captured by the image processor and (b) a visual indicator showing an appropriate imaging size of the symbol.

4. The commodity sales data processing apparatus of claim 1, wherein the commodity sales data processing apparatus is a portable terminal owned by a customer of a store selling the commodity.

5. The commodity sales data processing apparatus of claim 1, wherein the code symbol includes at least one of a barcode or a two-dimensional code.

6. The commodity sales data processing apparatus of claim 1, wherein the flag label at least partially covers a label on which the code symbol is formed.

7. The commodity sales data processing apparatus of claim 1, wherein the controller is configured to:
    determine whether the image captured by the image processor contains a feature corresponding to a discount label; and
    in response to a determination that the image captured by the image processor contains the feature corresponding to the discount label, extract the region from the image captured by the image processor.

8. The commodity sales data processing apparatus of claim 7, wherein the feature corresponding to the discount label is at least one of a shape or a color.

9. The commodity sales data processing apparatus of claim 1, wherein the controller is configured to:
    determine whether the image captured by the image processor contains a complete image of a discount label; and
    in response to a determination that the image captured by the image processor contains the complete image of the discount label, extract the region from the image captured by the image processor.

10. The commodity sales data processing apparatus of claim 1, wherein the symbol is a discount label including text indicating the discount information.

11. A commodity sales data processing apparatus comprising:
    an image processor configured to capture an image including a symbol, the symbol including discount information relating to a discount on a price of a commodity; and
    a controller configured to:
        acquire commodity information that uniquely specifies the commodity from a code symbol captured by the image processor;
        determine whether the image processor detects a flag label on the commodity, the flag label indicating that the price of the commodity is discounted; and
        extract a region from the image captured by the image processor in response to a determination that the image processor detects the flag label on the commodity, the region including a first section and a second section, and the first section including the symbol;
        modify a pixel of the second section to have a predetermined pixel value:
        resize, to a predetermined size, an image of the region extracted by the controller and including the modified pixel;
        transmit, to a server, the image of the region that has been resized;
        acquire, from the server, the discount information based on the image transmitted to the server;
        register (a) the commodity information acquired by the controller and (b) a discounted price of the commodity based on the discount information acquired by the controller in association with each other.

\* \* \* \* \*